US005197012A

United States Patent [19]

El-Sarout

[11] Patent Number: 5,197,012

[45] Date of Patent: Mar. 23, 1993

[54] METHOD AND APPARATUS FOR DETECTING AND FOR COUNTING ANY INSTANTANEOUS VARIATIONS IN A PROFILE, AND APPLICATIONS THEREOF

[75] Inventor: Mohamad El-Sarout, Villeneuve D'Ascq, France

[73] Assignee: Datatronic, Centre d'Etude et de Developpement Electronique et Informatique Sarl, France

[21] Appl. No.: 913,733

[22] Filed: Jul. 14, 1992

Related U.S. Application Data

[63] Continuation of Ser. No. 439,598, Nov. 20, 1989, abandoned.

[30] Foreign Application Priority Data

Nov. 21, 1988 [FR] France ................ 88 16091

[51] Int. Cl.$^5$ ................ G01N 21/89; G01N 21/86

[52] U.S. Cl. ................ 364/470; 369/563; 369/571.05; 356/376; 356/430; 250/560; 250/562

[58] Field of Search ................ 364/563, 565, 571.05, 364/470; 250/560, 562; 356/376, 430, 431

[56] References Cited

U.S. PATENT DOCUMENTS 3,594,558 7/1971 Koepfe ................ 364/563
3,907,439 9/1975 Zanoni ................ 250/560
4,450,352 5/1984 Olsson ................ 250/223
4,549,086 10/1985 Herzer ................ 250/561
4,894,551 1/1990 Kishimoto et al. ................ 356/376

*Primary Examiner*—Jerry Smith
*Assistant Examiner*—Patrick D. Muir
*Attorney, Agent, or Firm*—Ladas & Parry

[57] ABSTRACT

The invention consists in using a transmitter (23) of light to reproduce, in the plane of an optical detector (24), the profile of an object or a set of objects in contact or overlapping on a conveyor belt (21), e.g. newspapers (20), the profile being reproduced in the form of a function Y=f(X), then in scanning the profile by means of two receivers (27, 28) delimited by two slots (30, 31) in such a manner that the intersections of the function Y and the lines representing the two receivers are reduced approximately to two points with the distance between the two points being as small as possible, and finally in permanently determining the derivative Y'(X) and in actuating an electronic circuit associated with the detector (24) to generate an output signal proportional to the value of the derivative Y'(X). When used for detecting and counting, the output signal is compared with a predetermined value representative of an intantaneous variation (22) of the profile, and a pulse is emitted when the output signal exceeds the predetermined value. The invention is also applicable to detecting breaks in threads.

11 Claims, 8 Drawing Sheets

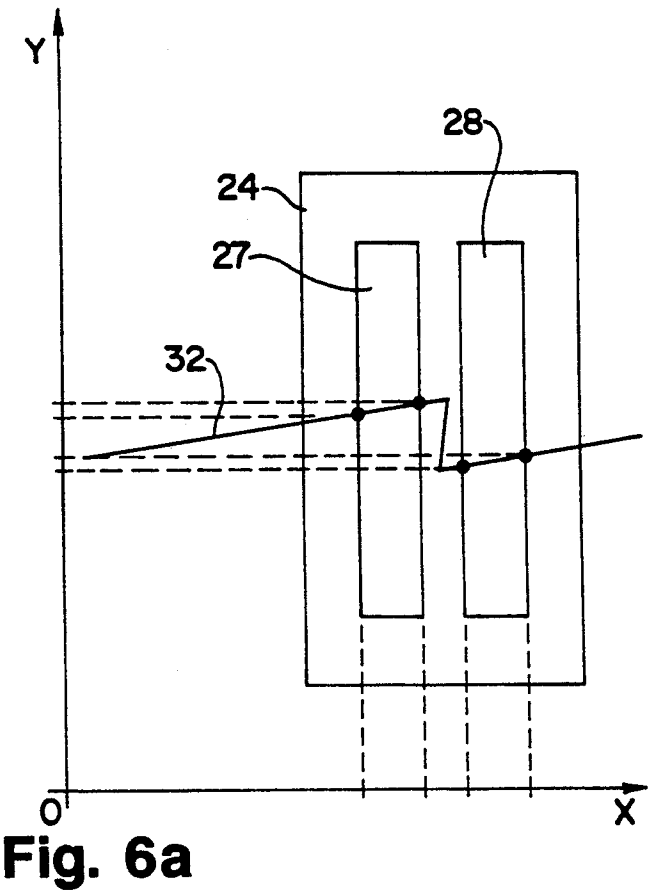
Fig. 6a
Fig. 6b
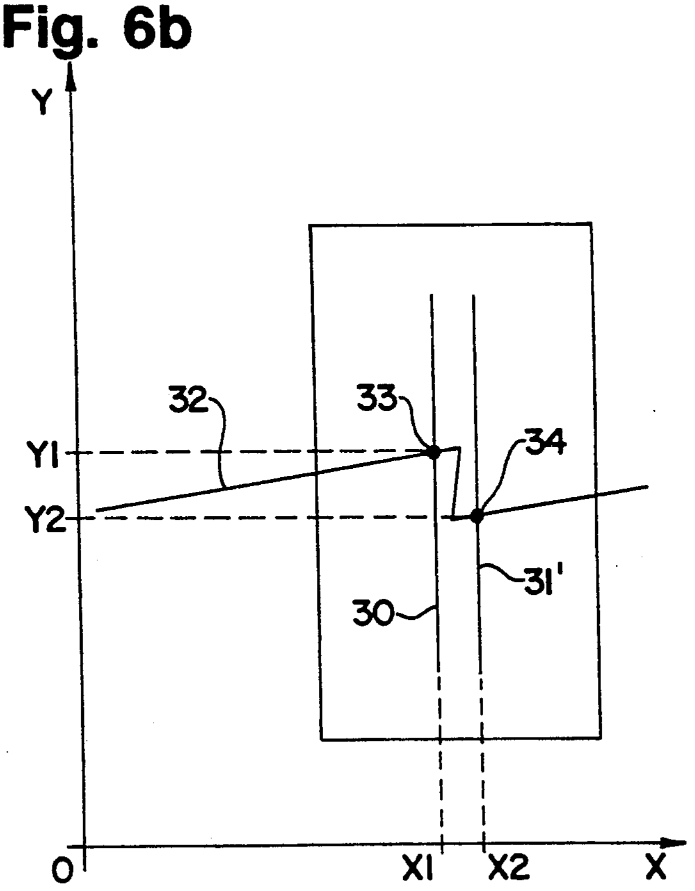
Fig. 7
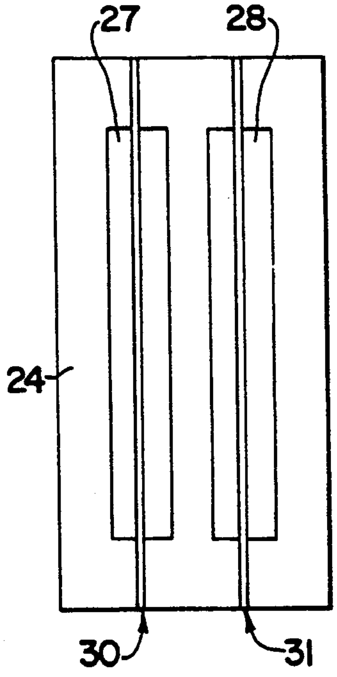

METHOD AND APPARATUS FOR DETECTING AND FOR COUNTING ANY INSTANTANEOUS VARIATIONS IN A PROFILE, AND APPLICATIONS THEREOF

This is a continuation of copending application Ser. No. 07/439,598 filed on Nov. 20, 1989 now abandoned.

The present invention relates to a method and apparatus for detecting and for counting any instantaneous variations in the profile of a continuously travelling object or set of objects overlapping one another on a conveyor, said profile being represented by a function Y=f(X).

The term "instantaneous variation" is used to designate any variation in a profile which is characterized by a very large change in slope between two points of the function Y=f(X) at a distance apart tends to zero.

BACKGROUND OF THE INVENTION

Known methods of detecting and counting instantaneous variations concern detecting and counting the dislocations caused by the overlap between two consecutive flat objects on a conveyor. They are consequently related to and limited to applications of counting continuously travelling flat objects that overlap one another on a conveyor.

Several methods and apparatuses based on different operating principles are known for use in counting continuously travelling flat objects overlapping one another on a conveyor. For example, there are mechanical or electromechanical counters that always require physical contact with the travelling articles, and there are optoelectronic counters which operate remotely without physical contact.

U.S. Pat. Nos. 3,969,993, 4,091,269, and 4,139,765 describe several methods and apparatuses for counting continuously travelling flat objects by means of physical contact. The reliability and accuracy of these methods and apparatuses depend, amongst other things, on the thickness of the objects, and consequently on the size of the dislocations, on the distance between two dislocations, on the speed of travel, and on the amplitude of conveyor vibration. Experience shows that these methods and apparatuses, even when operating under optimum conditions, are not satisfactory when the objects are thin and the speed of travel is very high. In addition, these apparatuses are subjected to the wear inherent to mechanical systems.

Several patents relate to optoelectronic detection and counting without physical contact. By way of example, mention may be made of the following patents: JP No. 770, GB 8410493, U.S. Pat. No. 4,450,352, and U.S. Pat. No. 4,771,443. The methods and apparatuses described in these patents share the common feature of using light reflected on the surface of continuously travelling objects for the purpose of detecting the passage of a dislocation and causing it to be counted. In spite of the considerable efforts that have been made to improve the reliability of the methods and apparatuses by making use of microprocessors in order to process the reflected light more reliably, the results obtained do not give entire satisfaction. The main parameters which disturb these methods and apparatuses are the surface state of the object (mat or brilliant), its color which reflects radiation more or less well, and vibration of the conveyor which may sometimes vibrate through an amplitude which is greater than the thickness of the object.

All of these parameters may influence the detection results and give rise to errors depending on the principle used.

All of the methods and apparatuses mentioned above provide an output signal which is directly proportional to variations in the function Y=f(X). Given that the value of Y corresponds to the thickness of the object or the set of objects, the output signal is consequently directly proportional to the thickness of continuously travelling objects. This implies that the apparatus needs adjusting whenever there is a change in the goods being produced in order to take account of the differences between the parameters applicable to the new run and the parameters applicable to the preceding run.

An object of the invention is to provide a method and apparatus enabling instantaneous variations, and only instantaneous variations, to be detected and counted, by scanning the profile of a continuously travelling object or set of overlapping objects on a conveyor. The method and the apparatus which provide an output signal directly proportional to the value of the derivative Y′ rather than the value of the function Y mitigate the observed drawbacks in that operation is independent of the thickness of the travelling objects, of their surface state, of their speed of travel, of the amplitude of any vibrations to which they may be subjected as they travel, and of the distance between two consecutive instantaneous variations.

SUMMARY OF THE INVENTION

The present invention provides a method and an apparatus for detecting instantaneous variations and only instantaneous variations with very high reliability, thereby ensuring an error rate which is very low or zero. The method of the invention consists:

a) in reproducing said profile in the plane of an optical detector in the form of a function Y=f(X), with the X axis corresponding to the travel direction and the Y axis corresponding to the direction in which the object or set of objects has or may have instantaneous variations in profile;

b) in scanning the profile by means of two receivers delimited by two slots in such a manner that the intersections between the function Y=f(X) defined by the profile and lines representative of the two receivers are reduced approximately to two points, with the distance between the two points being as small as possible;

c) in continuously determining the derivative Y′(X) and in actuating an electronic circuit associated with the optical detector to generate an output signal proportional to the value of the derivative Y′(X);

d) in exploiting the output signal; and e) in issuing an instruction as a function of the exploitation of the output signal.

In a first version of the method of the invention, applicable to detection and counting, the output signal is exploited by comparing it with a predetermined value representative of an instantaneous variation in the profile, and the instruction consists firstly in generating a pulse whenever the output signal exceeds the predetermined value, and secondly in exploiting the generated pulse.

In a second version of the method of the invention, the object is a textile thread having surface fibers, hairs, or tufts, and the method makes use of the stochastic distribution of such hairs. In this case, the instruction consists in emitting a pulse when the output signal is flat, indicating that the thread has broken or that it has stopped travelling.

The invention also provides apparatus specifically designed for implementing the above-specified method, i.e. apparatus for implementing the mathematical conditions required to obtain an output signal which is directly proportional to the value of the derivative Y'(X) and not to the function Y=f(X) as defined by the continuously travelling profile of an object or a set of objects in contact or overlapping on a conveyor. According to the invention, the apparatus comprises:

a) means for reproducing the profile of the continuously travelling object or set of contacting or overlapping objects on the conveyor, said profile being reproduced in the plane of an optical detector;

b) two receivers delimited by two slots ensuring that the intersections between the function Y=f(X) defined by the profile and lines representing the two receivers are reduced approximately to two points, with the distance between the two points being as small as possible; and c) an electronic circuit associated with the receivers including two converters connected to a differential amplifier and providing a signal directly proportional to the derivative Y'(X) of the function Y=f(X) defined by the profile.

In a first version of the apparatus of the invention, applied to detection and counting, the electronic circuit also includes a comparator suitable for comparing the output signal with a predetermined value, a pulse generator suitable for generating a pulse whenever the output signal exceeds the predetermined value, and an output unit exploiting the emitted pulse.

In a second version of the apparatus of the invention applied to detecting breaks in thread on a textile machine, the electronic circuit also includes an amplifier and highpass filter, a retriggerable monostable which changes state and delivers a pulse each time the amplified and filtered signal remains uniformly constant, and means controlled by said pulse for triggering an alarm or for stopping the machine.

Compared with existing methods and apparatuses, the method and apparatus of the invention present a considerable number of advantages. All instantaneous variations are detected and counted with a very high degree of reliability and an error rate which is very low or even zero. The apparatus is not subjected to any mechanical wear. Once installed it does not require adjusting. Detection and counting are independent of the thickness of the travelling object, of the spacing between two successive objects when dealing with a set of overlapping objects, of surface state, of color, of travel speed, and of the amplitude of any vibrations to which the object or the set of objects may be subjected while travelling.

Applications of the method and the apparatus of the invention include detecting and counting continuously travelling objects that are in contact with one another, in particular cigarettes, or objects overlapping one another on a conveyor, in particular newspapers. Applications also concern detecting knots in textile threads, as well as detecting thread breaks or stoppages of thread travel in a textile machine.

BRIEF DESCRIPTION OF THE DRAWINGS

Other characteristics and advantages of the invention appear more clearly on reading the following description given by way of non-limiting example of two embodiments of the invention: a first example concerns detection apparatus suitable for counting newspapers, and the second example is suitable for detecting knots in textile threads. In the description, reference is made to the accompanying drawings, in which:

FIG. 6 consisting of 6*a* and 6*b*, shows the intersection of the curve defined by the profile and the two receivers;

FIG. 7 shows the detector plane, the two receivers, and the two slots;

DETAILED DESCRIPTION

Figure 1A:
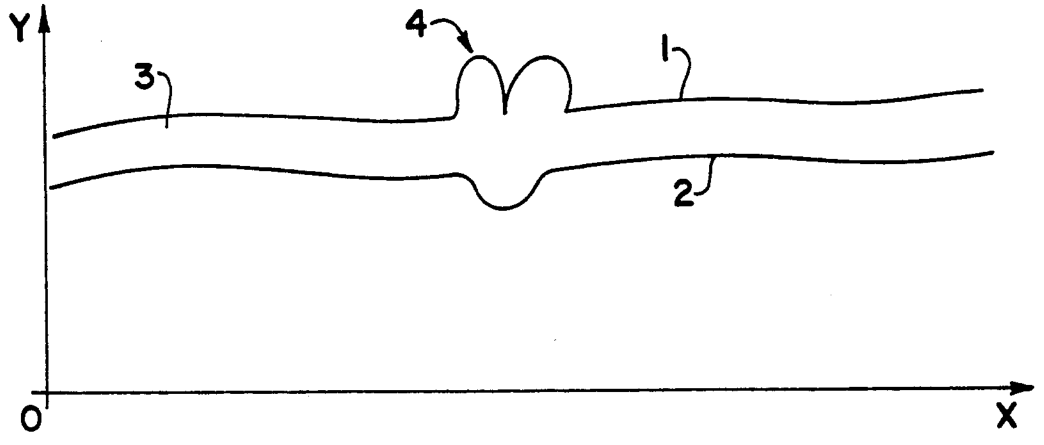
FIG. 1 shows the curves of functions Y=f(X) defined by the profiles of continuously travelling objects that present instantaneous variations, with the curve of FIG. 1*a* representing a single object, the curve of FIG. 1*b* representing a set of objects in contact, and the curve of FIG. 1*c* representing a set of objects overlapping on a conveyor.
Figure 1B:
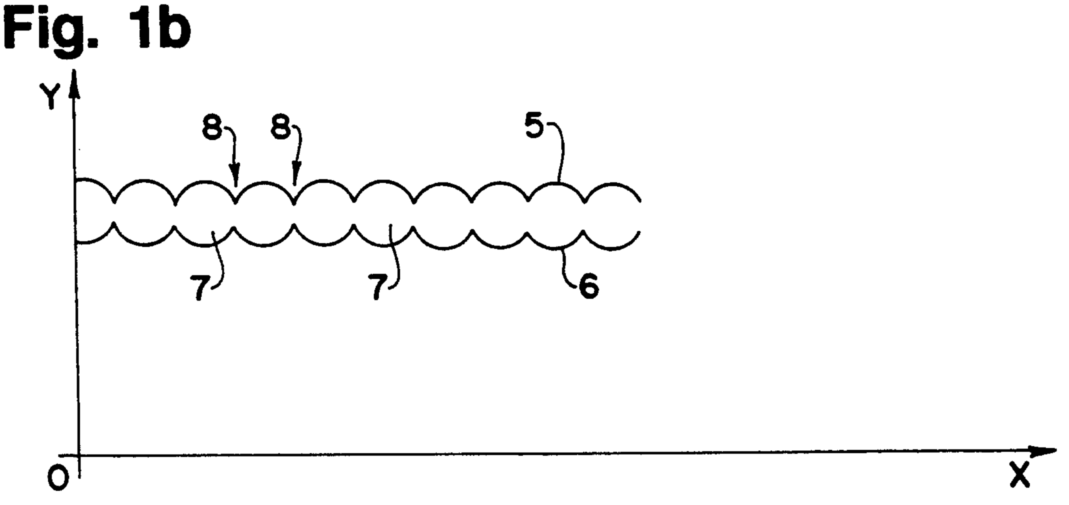
Figure 1C:
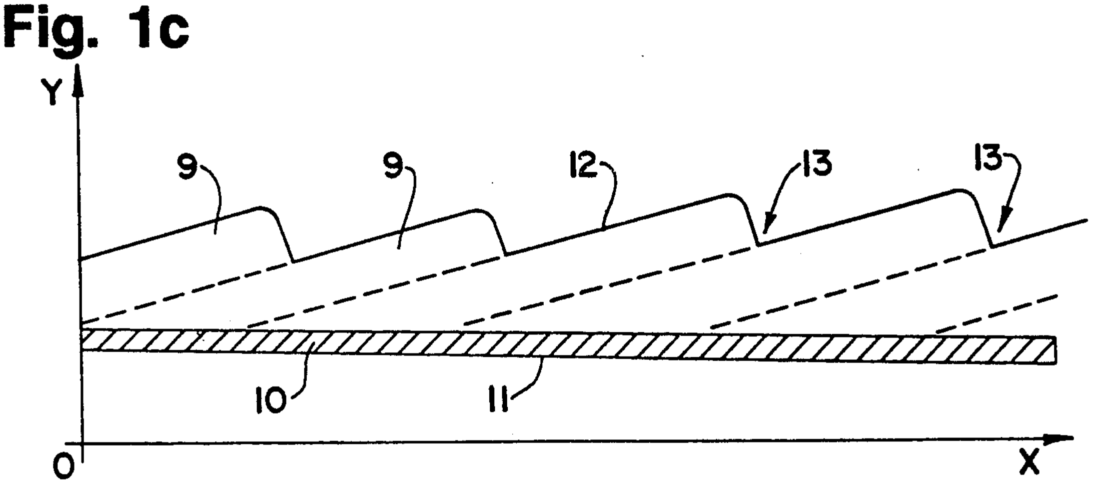

FIG. 1 shows three examples of "instantaneous variations" in profiles, within the meaning of the present specification. The profiles of objects are shown in the form of funtions Y=f(X) plotted in rectangular co-ordinates, i.e. the profiles are shown as projections of the outside surfaces of the objects onto a reference plane. In FIG. 1*a*, the two curves 1 and 2 correspond to the top and bottom profiles of an object 3 in the form of a thread and having an instantaneous variation 4, e.g. a knot. In FIG. 1*b*, the two curves 5 and 6 correspond to the top and bottom profiles of a set of objects 7 which are in contact, e.g. cigarettes; the instantaneous variations 8 in the profile correspond to going from one object to the next. FIG. 1*c* represents a set of flat objects 9, e.g. newspapers or folded packaging products, with the objects overlapping one another on a conveyor belt 10. Curve 11 corresponds to the bottom of the conveyor belt 10 and is rectilinear, while curve 12 corresponds to the top of the objects 9 and has instantaneous variations 13.

Figure 2A:
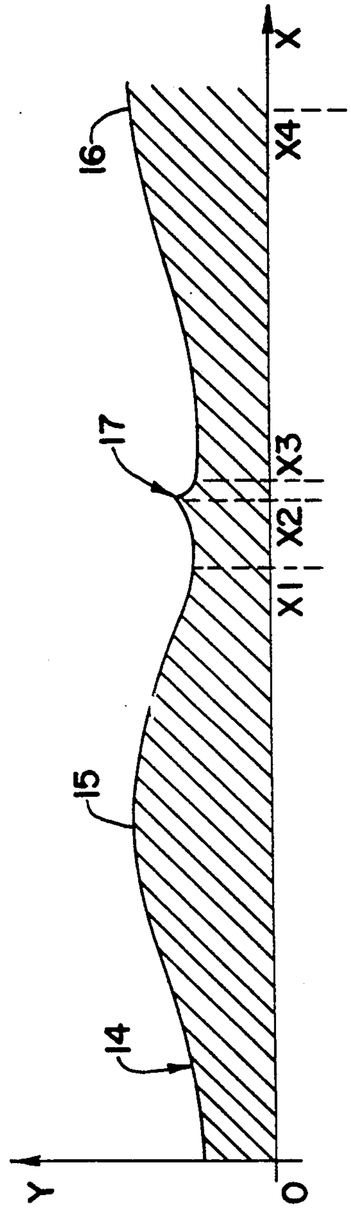
FIG. 2 shows a curve corresponding to a function Y=f(X) (FIG. 2*a*) and the curve corresponding to its derivative Y'(X) (FIG. 2*b*), said function Y being defined by a profile having continuous smooth variations and one instantaneous variation.

An instantaneous variation in a profile is a sudden variation, as contrasted with a variation which is continuous and smooth. FIG. 2*a* shows a curve 14 of Y=f(X) representing the profile of an object and including not only variations which are continuous and smooth, being approximately sinusoidal in shape with two maximums 15 and 16, but also an instantaneous variation 17 in the form of a small peak. All known methods for detecting and counting increases in thickness, i.e. magnitudes which are directly proportional to thickness, are incapable of detecting the instantaneous variation 17 without also detecting the maximums 15 and 16. They operate by detecting and counting values in the function Y that exceed a certain threshold proportional to the thickness of the object. However, in the case illustrated in FIG. 2*a*, the thicknesses corresponding to the maximums 15 and 16 are greater than the thickness due to the instantaneous variation 17.

Figure 2B:
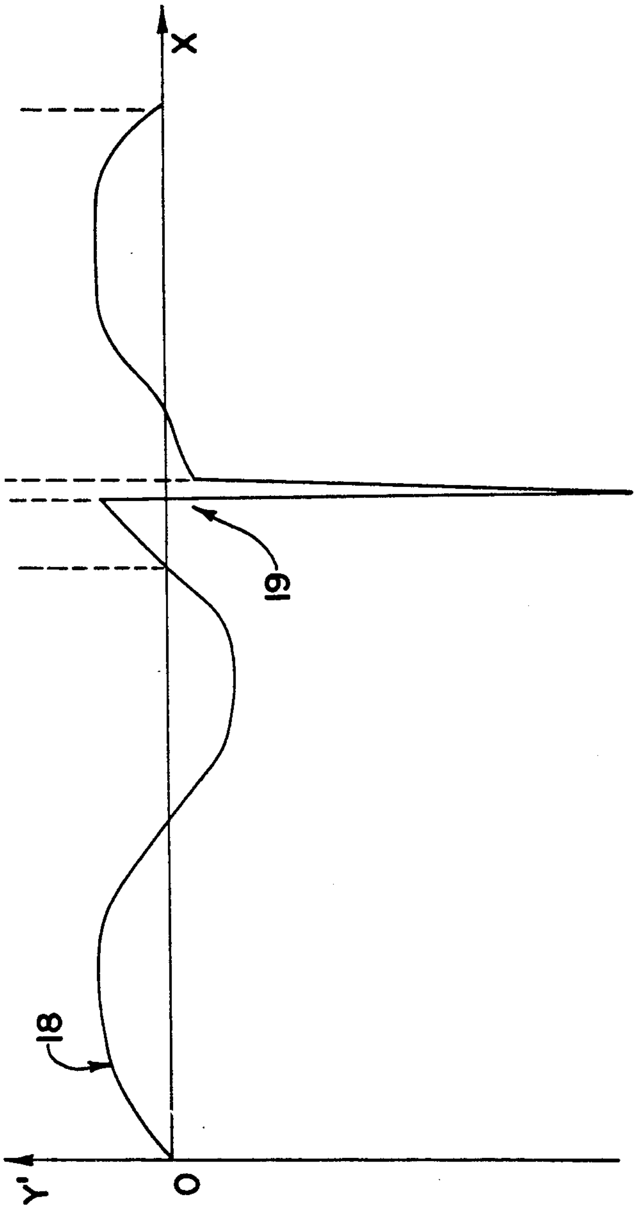
Figure 3:
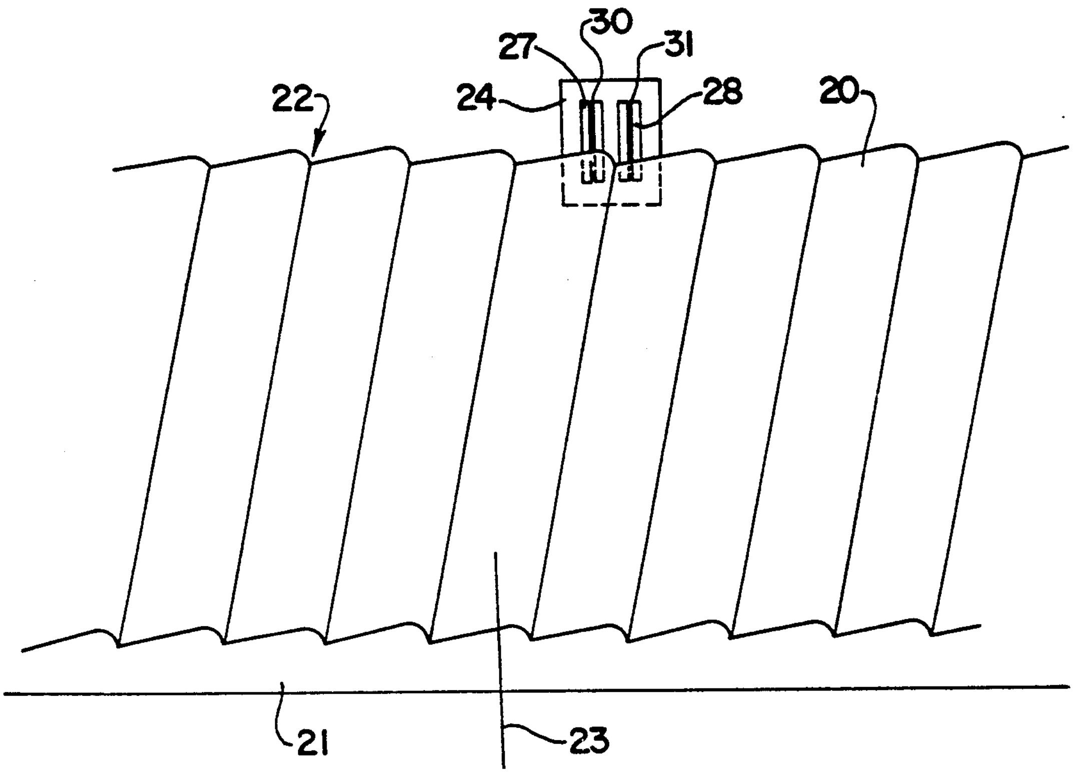
FIG. 3 is a diagrammatic perspective view of a portion of apparatus placed at the outlet from an installation for folding newspapers or packaging goods.
Figure 4:
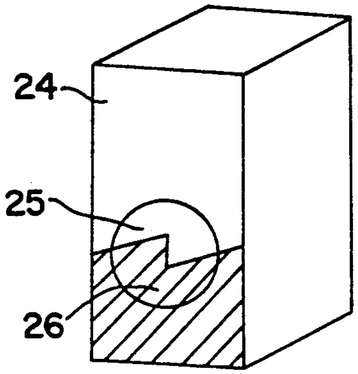
FIG. 4 is a perspective view of a detector together with the reproduction of a portion of a profile at some instant.

The method of the invention is not based on the function Y=f(X), but on the derivative Y'(X) of this function. In FIG. 2*b*, there is a curve 18 facing the curve 14 and corresponding to the derivative Y'(X) of the function Y. The continuous and smooth variations in the curve 14 correspond to small and smooth variations in the curve 18 with the derivative Y' having the value zero at the maximums 15 and 16. The instantaneous variations 17 in the curve 14 corresponds to a variation 19 in the curve 18 which is both short and very large. Thus, in accordance with the method of the invention, since the output signal is proportional to the derivative Y', its value will be low when variations in the profile are continuous and smooth, and its value will be very large when the variation in question is instantaneous.

The method of the invention ignores variations which are continuous and smooth, i.e. such as those shown in the intervals (O,X1) and (X3,X4) in FIG. 2*a*, since these variations give rise to very small values for the derivative shown in FIG. 2*b*. However, the instantaneous variation which takes place in the interval (X2,X3) as shown in FIG. 2*b* is detected and counted since it provides a derivative of very large magnitude, as shown in FIG. 2*b*.

In a first example which is now described, the apparatus of the invention is mounted at the outlet from an installation for folding flat objects, e.g. newspapers. After being printed, the folded newspapers 20 are placed on a conveyor belt 21. Given the speed of travel of the conveyor belt 21 and the rate at which newspapers are placed thereon, the newspaper 20 put into place at some given instant will partially overlap the newspaper put into place at the preceding instant. It is this overlap which gives rise to dislocations 22. The value of each dislocation 22 is generally equal to the thickness of a newspaper. It will be understood that such a dislocation 22 corresponds to an instantaneous variation in the top profile of the newspapers 20.

Figure 5:
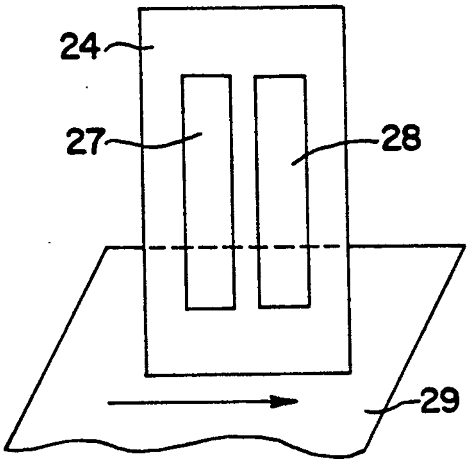
FIG. 5 shows the detection plane with two receivers, together with the travel plane.

The object or the set of objects, in this case the newspapers 20 on the conveyor belt 21, is/are caused to pass between a transmitter 23 and a detector 24 placed on opposite sides of the conveyor belt 21. The transmitter 23 is constituted by a source of electromagnetic radiation, preferably visible or invisible light, and the radiation may optionally be modulated. The detector 24 is constituted by two receivers 27 and 28, together with a diaphragm. The two receivers 27 and 28 are rectilinear in shape and their width is very small compared with their length. They are identical in shape and in physical characteristics. They are disposed parallel to each other and perpendicularly to the travel plane 29 (FIG. 5), and they are placed one after the other in the travel direction. The diaphragm consists in two slots 30 and 31 disposed in front of respective ones of the receivers 27 and 28. The gap between the two slots 30 and 31 is as small as possible. The width of each slot 30 and 31 is as small as possible.

The radiation flux is intersected by the object or objects, and reproduces the profile of the object or the objects on the detectors, such that each detector has an irradiated zone 25 and a non-irradiated zone 26 which is eclipsed by the object(s). By causing the object(s) to travel between the transmitter 23 and the detector 24, the profile is scanned by the detector 24 by virtue of the radiation flux being intersected. Since the transmitter 23 and the detector 24 are placed level with the carrying plane of the conveyor belt 21, the receivers 27 and 28 must be long enough to ensure that the radiation flux emitted by the transmitter 23 is never completely interrupted by the cross-section of the newspapers on the conveyor 21. This ensures that the profile of the travelling newspapers is continuously scanned by the receivers 27 and 28.

It is also possible to reproduce a real image of the profile on the plane of the detector while having the transmitter 23 and the detector 24 on the same side of the travelling object(s), but this requires an additional optical device to be used.

FIG. 6 shows the reproduction of a curve 32 in the plane of the detector 24 fitted with the two receivers 27 and 28 shown without slots in FIG. 6*a* and with the two slots 30 and 31 in FIG. 6*b*. Since the slots 30 and 31 are very narrow, the intersections between the profile-representing curve 32 and the slots 30 and 31 are reduced merely to two points 33 and 34 as shown in FIG. 6*a*, whereas the intersections correspond to two lines when the receivers 27 and 28 are not provided with the slots 30 and 31, as shown in FIG. 6*a*. In addition, because of the small gap between the points of intersection 33 and 34 of the curve 32 and the slots 30 and 31, conditions obtain that ensure that the output signal delivered by the detector 24 is proportional to the derivative Y'(X) of the function Y=f(X). The gap dX between the slots 30 and 31 is constant and tends towards zero, and the signal is proportional to dY, i.e. the difference between the two values of Y at the points 33 and 34.

Figure 9A:
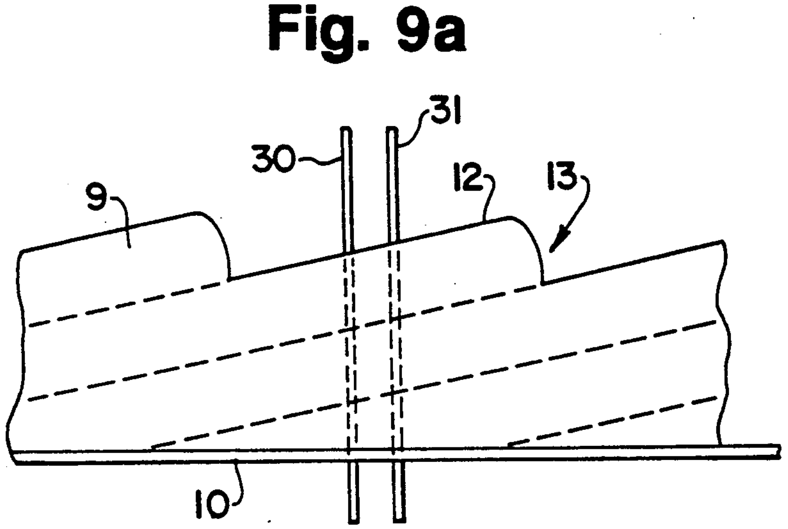
FIG. 9 shows a projection of the profile of goods overlapping on a conveyor that has stopped in front of the receivers at an instant t1 (FIG. 9*a*) and at an instant t2 (FIG. 9*b*)
Figure 9B:
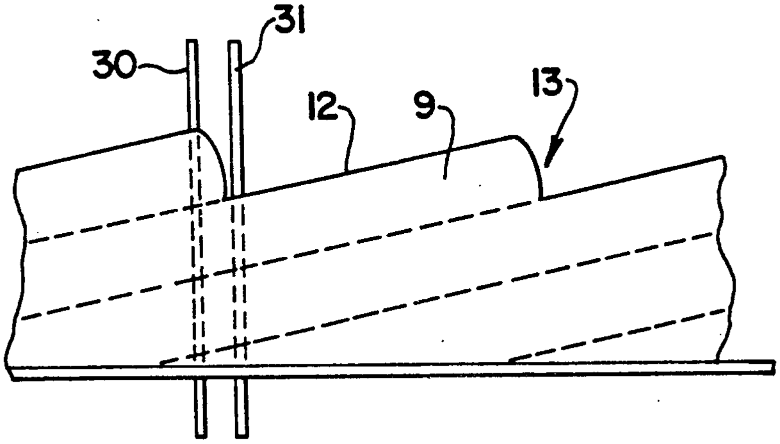
Figure 10A:
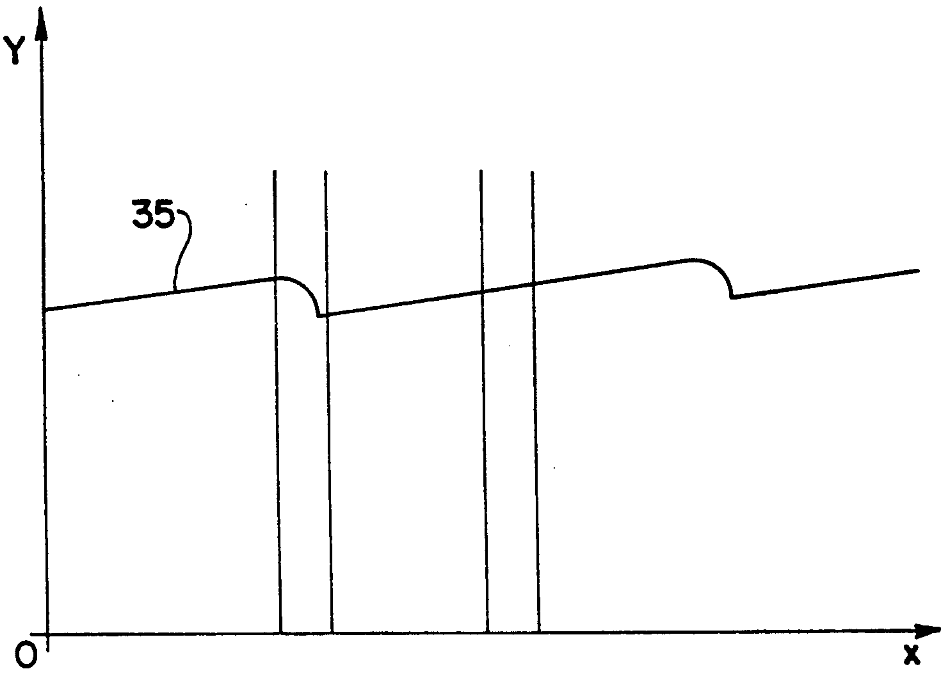
FIG. 10 shows both the function (FIG. 10*a*) defined by goods overlapping on a conveyor, and its derivative (FIG. 10*b*)

FIG. 9*a* is a diagram of the conveyor belt 21 supporting the newspapers 20 stationary in front of the two slots 30 and 31 at a given instant t1. FIG. 9*b* shows the same belt 21 stationary in front of the two slots 30 and 31 at a given instant t2. Let Y=f(X) be the function representing the profile of the newspapers (FIG. 10*a*), then the derivative of Y is:

$$Y'=dY/dX, \text{ for dX tending to zero.}$$

Figure 10B:
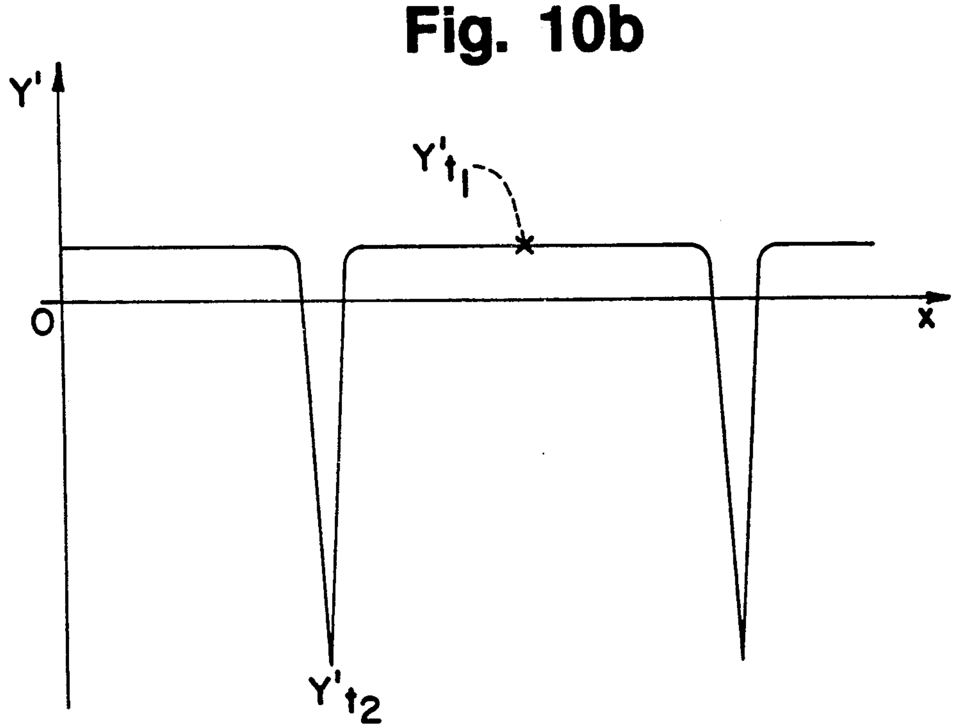

The ideal function of Y' is shown in FIG. 10*b*. However, Y' can be determined approximately as follows:

$$\text{at instant t1, } Y'_{t1}=(Y2_{t1}-Y1_{t1})/(X2-X1), \text{ and}$$

$$\text{at instant t2, } Y'_{t2}=(Y2_{t2}-Y1_{t2})/(X2-X1).$$

The signal delivered by each receiver 27, 28 is proportional to the quantity of radiation it receives over its entire area. When an object intersects the flux, the signal delivered is reduced as a function of the section of the substance intersecting the flux. Given that the slots 30 and 31 are very narrow, it may be considered that the signal delivered is proportional to the difference between the total length L of the receiver and the thickness l of the substance intersecting the flux, i.e.

Y=C(L−l). When using two receivers as shown in FIG. 9 which are identical in size and which have the same physical characteristics, two signals are available $Y1_{t1}$ and $Y2_{t1}$, where $$Y1_{t1}=C(L-l1) \text{ and}$$

$$Y2_{t1}=C(L-l2)$$

where l1 is the thickness of the belt 21 plus the newspapers 20 in front of the first receiver 30, and l2 is the thickness of the belt 21 plus the newspapers 20 in front of the second receiver 31. The value of dY at instant t1 is:

$$dY=Y2_{t1}-Y1_{t1}=C(l1-l2)$$

and in this case dX is a constant defined by the distance between the two slots:

$$dX=X2-X1$$

By performing the division dY/dX, an approximate value is obtained for the derivative $Y'_{t1}$, with said value differing very little from the theoretical value when the difference X2−X1 is very small (see FIG. 10*b*).

At instant t2, $Y'_{t2}$ is obtained in the same way (FIG. 10*b*).

Figure 8A:
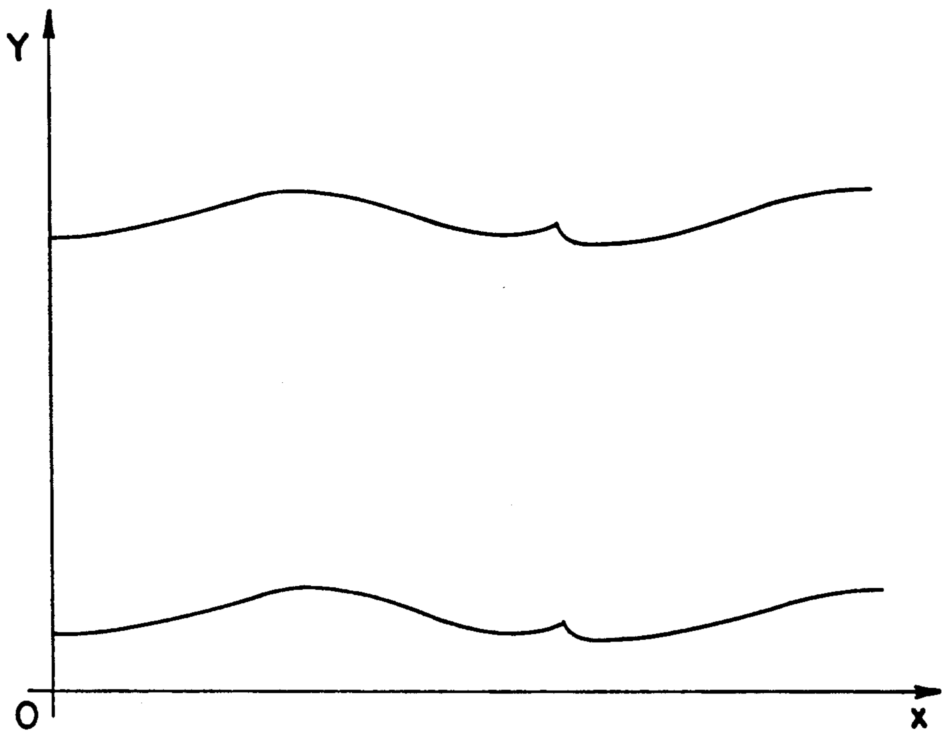
FIG. 8 shows the behavior of the derivative (FIG. 8*b*) when the function representing the profile moves in the Y direction (FIG. 8*a*)
Figure 8B:
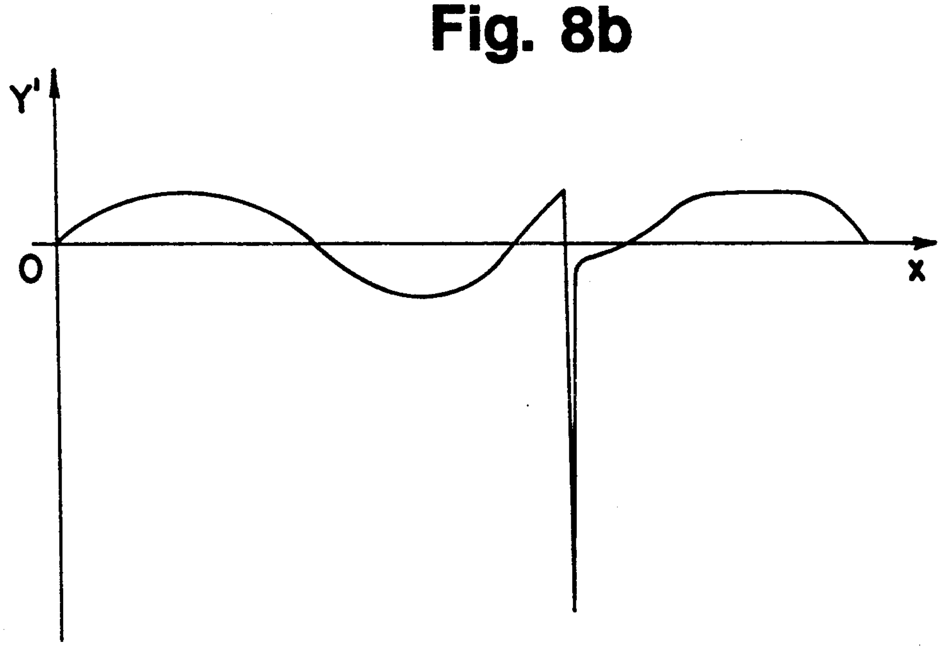

It will be understood that the value of the derivative Y'(X) is independent of the position of the curve Y=f(X) relative to the origin. This is illustrated in FIG. 8 which shows that the curve Y'(X) is the same for two curves Y=f(X) which are offset up the Y axis. This explains why the method is independent of any vibrations to which the object or the set of objects may be subjected during travel.

An electronic circuit is associated with the receivers and serves firstly to preprocess the signal in order to provide signals which are directly proportional to the derivative of the function defined by the profile, and then to compare the value of the derivative with a predetermined value, on a continuous basis. In operation, the predetermined value of the derivative defines a safety threshold.

The receivers 27 and 28 may be silicon photodiodes which are particularly sensitive in the infrared.

Each photodiode 27, 28 is coupled to a converter transforming its signal into voltage signals. The two converters 35 and 36 are connected to a differential amplifier 37 which is itself connected to a comparator 38.

The comparator 38 is connected to a pulse generator 39 which emits a pulse each time the value of the derivative reaches a maximum as shown in FIG. 10. This maximum corresponds to an instantaneous variation in the shape of the profile 35, and it is always clearly greater than the value of the derivative of the curve where there is no instantaneous variation. The generator 39 is connected to a sensor 40 which displays the number of pulses emitted, i.e. the number of instantaneous variations which have travelled between the transmitter 23 and the detector 24, and thus the number of newspapers 20.

Figure 11:
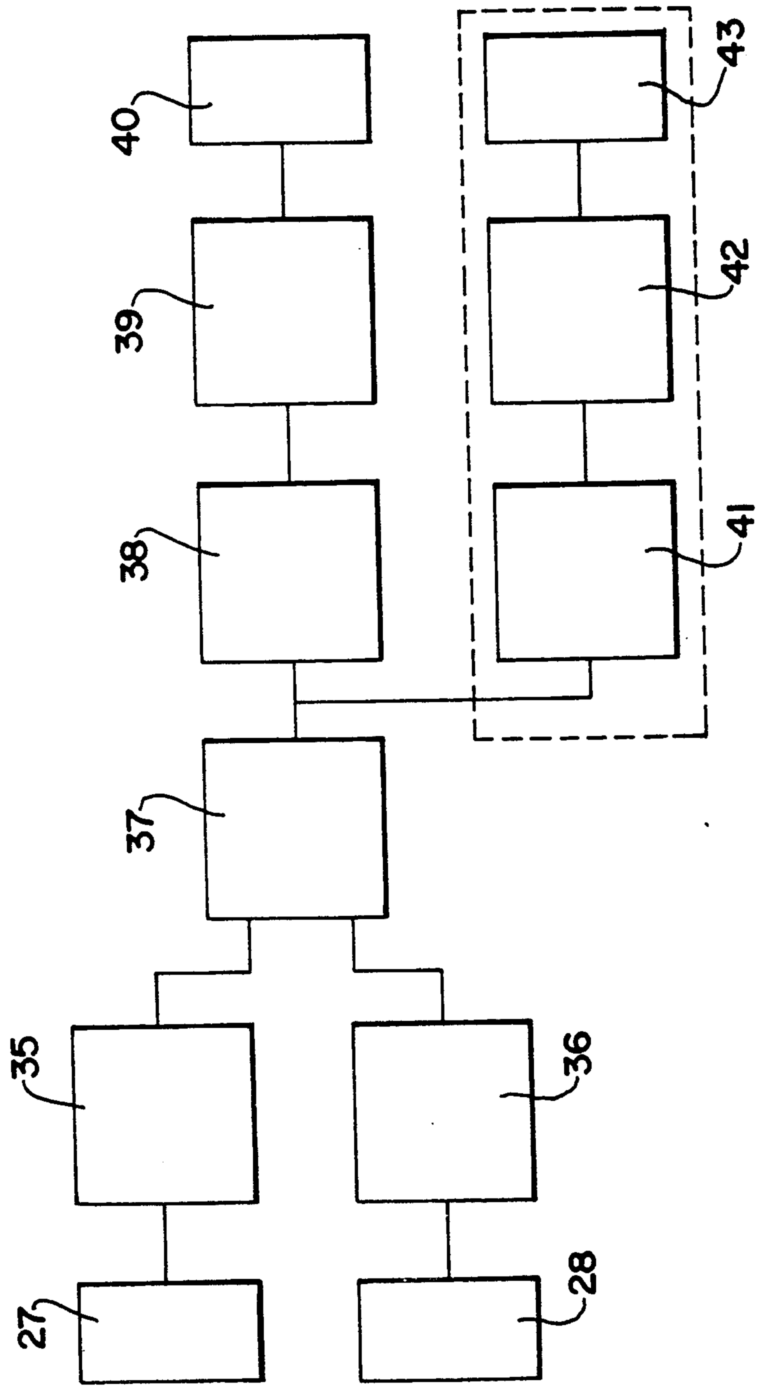
FIG. 11 is a block diagram showing various components of the apparatus.

In a second embodiment of the apparatus, intended for detecting knots in a textile thread, the transmitter 23 and the detector 24 are placed on either side of the path followed by the thread, e.g. on a reeling machine or a balling machine. Although the profile of a knot is more complicated than the profile of overlapping objects, they share the common feature of instantaneous variations in the function representing the profile. These instantaneous variations are detected and evaluated in the same manner as described above. The block diagram of FIG. 11 having the comparator 38, the pulse generator 39, and the counter 40 remains valid.

When performing such detection on a textile machine, the same apparatus can also be used to detect thread breakages, and this may be done in addition to detecting knots. To do this, use is made of the stochastic distribution of hairs existing on the surface of the thread, which hairs provide impulse noise. The output signal corresponding to this impulse noise is negligible compared to the signal provided by an instantaneous variation such as a knot going past. Consequently, this impulse noise is filtered and amplified and is then applied to a retriggerable monostable. The monostable changes state when the pulse stop arriving, i.e. either because the thread has stopped travelling or because the thread has broken. To do this, the apparatus includes, connected to the output of the differential amplifier 37, an amplifier and highpass filter 41 connected to a retriggerable monostable 42 which provides a signal suitable for an actuator 43.

The invention is not limited to the embodiments described above by way of non-limiting example, but extends to any variant that comes within the scope of the claims. In particular, other types of transmitter and receiver could be used.

I claim:

1. Apparatus for mechanical and optoelectronic detection of instantaneous variations in the profile of a continuously traveling object or set of contacting or overlapping objects on a conveyor, the apparatus comprising:

a) means for reproducing the profile of the continuously traveling object or set of contacting or overlapping objects on the conveyor, said profile being reproduced in the plane of an optical detector;

b) two receivers delimited by two slots ensuring that the intersections between the function Y=f(X) defined by the profile and lines representing the two receivers are reduced approximately to two points, with the distance between the two points being as small as possible; and c) an electronic circuit associated with the receivers including two converters connected to a differential amplifier and providing an output signal directly proportional to the derivative Y'(X) of the function Y=f(X) defined by the profile.

2. The apparatus according to claim 1, wherein the electronic circuit also includes a comparator suitable for comparing the output signal with a predetermined value, a pulse generator suitable for generating a pulse whenever the output signal exceeds the predetermined value, and an output unit exploiting the generated pulse.

3. The apparatus according to claim 1, for detecting breakages in or stoppages of the thread on a textile machine, wherein the electronic circuit also includes an amplifier and highpass filter, a retriggerable monostable which changes state and delivers a pulse each time the amplified and filtered signal remains flat indicative of the breakages or stoppages, and means controlled by said pulse for triggering an alarm or for stopping the machine.

4. The apparatus of claim 2, in use of detecting and recording variations of the overlapping or contacting objects continuously traveling in a conveyor belt, wherein the contacting objects are cigarettes forming consecutive top and bottom profiles and wherein the overlapping objects are folded newspapers.

5. An optoelectronic method for detecting instantaneous variations in the profile of a continuously traveling object or set of objects, the method comprising the steps of:

a) reproducing said profile in the plane of an optical detector in the form of a function Y=F(X), with the X axis corresponding to the travel direction and the Y axis corresponding to the direction in which the object or set of objects may have instantaneous variations in the profile;

b) scanning the profile by means of two receivers delimited by two slots in such a manner that the intersections between the function Y=f(X) defined by the profile and lines representative of the two receivers are reduced approximately to two points, with the distance between the two points being as small as possible;

c) continuously determining the derivative Y'(X) and actuating an electronic circuit associated with the optical detector to generate an output signal directly proportional to the value of the derivative Y'(X);

d) exploiting the output signal;

e) issuing an instruction as a function of the exploitation of the output signal; and f) adjusting the traveling objects responsive to the instruction issued.

6. The method according to claim 5, wherein the output signal is exploited by comparing it with a predetermined value representative of an instantaneous variation in the profile, and wherein the instruction includes the steps of generating a pulse whenever the output signal exceeds the predetermined value, and then exploiting the generated pulse.

7. The method according to claim 6, for detecting the instantaneous variations in the profile of a textile thread having surface hairs, and exploiting the stochastic distribution of said hairs, wherein the instruction further includes emitting a pulse when the output signal is flat, indicating that the thread has broken or has stopped traveling.

8. The method of claim 6, in use of detecting a textile thread, wherein breakages in the thread or stoppages in its travel are detected.

9. An optoelectronic method for detecting and for counting instantaneous variations in the profile of a continuously traveling object or set of objects, the method comprising the steps of:

a) reproducing said profile in the plane of an optical detector in the form of a function Y=f(X), with the X axis corresponding to the travel direction and the Y axis corresponding to the direction in which the object or set of objects may have instantaneous variations in the profile;

b) scanning the profile by means of two receivers delimited by two slots in such a manner that the intersections between the function Y=f(X) defined by the profile and lines representative of the two receivers are reduced approximately to two points, with the distance between the two points being as small as possible;

c) continuously determining the derivative Y'(X) and actuating an electronic circuit associated with the optical detector to generate an output signal directly proportional to the value of the derivative Y'(X);

d) comparing the output signal with a predetermined value representative of an instantaneous variation in the profile;

e) generating a pulse whenever the output signal exceeds the predetermined value;

f) counting each pulse-generated as a measure of the number of the continuously traveling objects.

10. The method of claim 9, in use of detecting and counting variations of continuously traveling objects in contact or in overlap on a conveyor belt, wherein the contacting objects are cigarettes forming consecutive top and bottom profiles and wherein the overlapping objects are folded newspapers.

11. The method according to claim 10, in use of detecting a traveling textile thread, wherein knots in the thread are detected and counted.

* * * * *